J. C. BARTLEY AND J. G. OPHARDT.
SHIELD FOR AUTOMOBILE LAMPS.
APPLICATION FILED SEPT. 27, 1919.
1,354,873.
Patented Oct. 5, 1920.
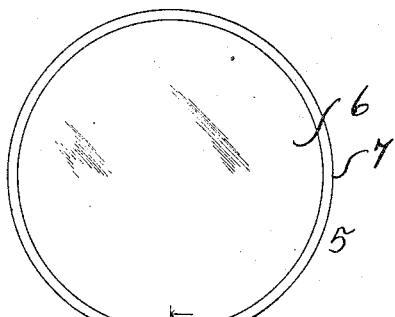
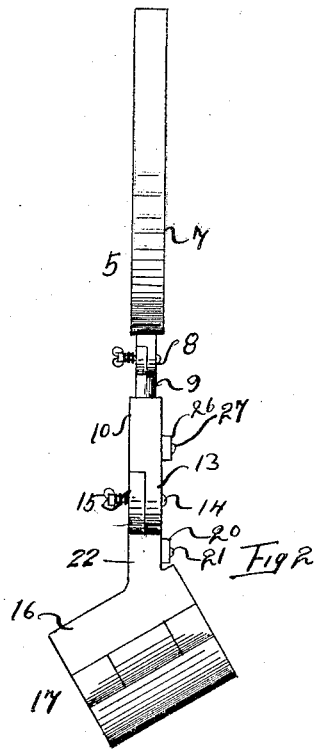
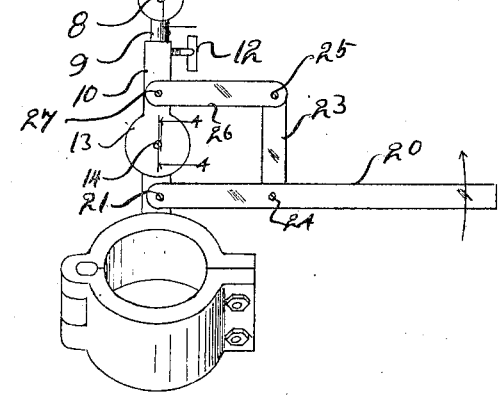
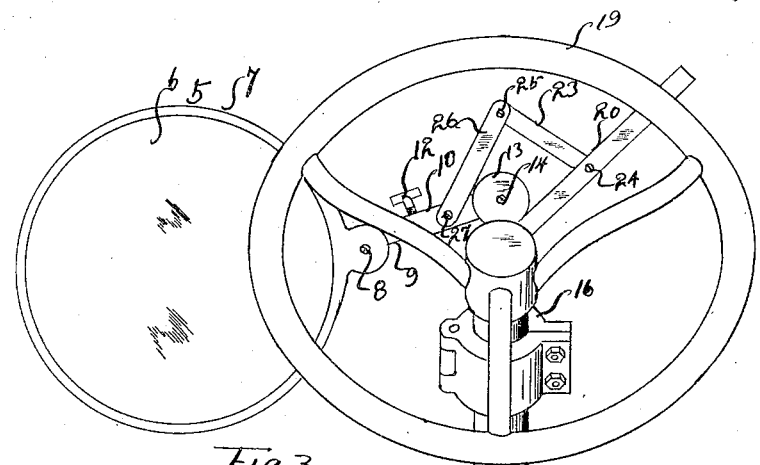
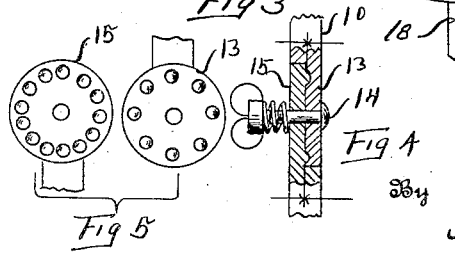
John C. Bartley.
John G. Ophardt.
Inventors

UNITED STATES PATENT OFFICE.

JOHN C. BARTLEY AND JOHN G. OPHARDT, OF PLATTEVILLE, COLORADO.

SHIELD FOR AUTOMOBILE-LAMPS.

1,354,873.   Specification of Letters Patent.   Patented Oct. 5, 1920.

Application filed September 27, 1919. Serial No. 326,941.

*To all whom it may concern:*

Be it known that we, JOHN C. BARTLEY and JOHN G. OPHARDT, citizens of the United States, residing at Platteville, county of Weld, and State of Colorado, have invented certain new and useful Improvements in Shields for Automobile-Lamps; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in shields adapted to be mounted on any automobile to shield the eyes of the driver from the glare of the lamps of approaching machines. Our present invention may be considered an improvement over the construction shown in our copending application, Serial No. 324,947.

The object of this improvement is to facilitate the shifting of the colored glass member from a position in front of the eyes of the driver to a lower position, and vice versa, as may be required, and to this end the invention consists of the features hereinafter described and claimed, all of which will be fully understood by reference to the accompanying drawing, in which is illustrated an embodiment thereof. In this drawing:

Figure 1 is a front view of our improvement.

Fig. 2 is a side elevation of the same.

Fig. 3 is a front view, showing the colored glass member shifted to one side and below its normal position.

Fig. 4 is a sectional view taken on the line 4—4, Fig. 1, the parts being shown on a larger scale.

Fig. 5 illustrates in detail the two parts which are shown assembled in Fig. 4.

The same reference characters indicate the same parts in all the views.

Let the numeral 5 designate the colored glass member, the glass part being designated 6 and the rim or metal binding for the edge being designated 7. The part 6 may consist of amber colored glass, or glass or other transparent or semi-transparent material suitably treated to protect the eyes of the driver from the glare of approaching or forwardly located lamps. The device 5 is pivotally connected, as shown at 8, with a stem 9, which is vertically adjustable in the sleeve 10, the stem being held in the desired position of adjustment by a set screw 12. The lower extremity of the sleeve is considerably enlarged and flattened, as shown at 13, where it is pivotally connected, as shown at 14, with an adjacent part 15, which, as illustrated in the drawing, is formed integral with one member 16 of a clamp 17, adapted to be secured to the stationary casing 18 of the steering post of th machine.

As illustrated in the drawing, this clamp is applied to the casing 18, a suitable distance below the steering wheel 19.

The inner extremity of the lever arm 20 is pivotally connected, as shown at 21, with a part 22 between the clamp and the part 15. Between the extremities of the lever arm 20 a part 23 is connected as shown at 24. The connection 24 may be either pivotal or rigid, as may be required. The part 23 is pivotally connected, as shown at 25, with one extremity of a link 26, whose opposite extremity is pivotally connected as shown at 27, with the sleeve 10 above the pivot 14, while the lever arm 20 is connected with the part 22 below the pivot 14.

When the device 5 is employed to shield the eyes of the driver, it will be approximately in the position indicated in Figs. 1 and 2. When, however, it is desired to remove it from its position when in use, the driver, by pushing upon the lever arm 20 in the direction indicated by the arrow in Fig. 1, may quickly throw the device 5 to the position shown in Fig. 3 when it is not desired to use the same. When, however, it is desired to bring the device 5 to its normal position, it may be quickly brought to such position by the movement of the lever arm 20 in the direction opposite that indicated by the arrow in Fig. 1.

Our improved construction makes it practicable to remove the element 5 from a position in front of the eyes of the driver as soon as an automobile has passed, and return the same to its normal position for the protection of the eyes, as soon as it is necessary, or upon the approach of another machine.

It will be readily understood that it is important that the driver's view should not be obstructed any longer than necessary; hence, by virtue of our improved adjustment, the element 5 may be so quickly thrown out of commission and again brought into position for use that it is practicable to do this every time an automobile passes, assuming that they are any considerable distance apart.

It is preferred that the engaging surfaces of the two parts 13 and 15 shall be respectively provided with shallow counterpart recesses and projections and that provision be made around the pivot for yieldingly retaining the two members in close contact. When, however, it is desired to adjust the device 5 or move it on the axis of the pivot pin 14, the spring will allow the two parts to move away from each other sufficiently to permit the projections of one part to move out of one set of recesses and engage another set, whereby the part 5 will be securely retained in any adjusted position. (See Figs. 4 and 5.)

By pivotally connecting the lever arm 20 with the part 23 at the point 24, it will be noted that the device 5 may be shifted in either direction, that is, toward the left, as indicated in Fig. 3, or in the opposite direction if it should be desired to do so.

Attention is called to the fact that the construction where the pivot 8 is located and surrounding the pivot, is the same as illustrated in Figs. 4 and 5, though the latter refer directly to the construction where the pivot 14 is located.

We claim:

1. In a device of the class described, the combination of a shield having a downwardly projecting stem, a stationary member with which the stem is pivotally connected, a lever arm pivotally connected with the stationary part on one side of the stem pivot, a link connected with the stem on the opposite side of the last named pivot, and an operative connection between the link and the lever arm.

2. The combination of a shield provided with a stem, a member with which the stem is pivotally connected, a lever arm pivotally connected with said member below the the first named pivotal connection, and a link connection between the lever arm and the stem at a point on the opposite side of the first named pivotal connection.

3. The combination of a shield provided with a stem, a member with which the stem is pivotally connected, a lever arm pivotally connected with said member below the first named pivotal connection, and a plurality of links connecting the lever arm with the stem at a point above the first named pivotal connection.

In testimony whereof we affix our signatures.

JOHN C. BARTLEY.
JOHN G. OPHARDT.